US011001328B2

(12) United States Patent
    Hu

(10) Patent No.: US 11,001,328 B2
(45) Date of Patent: May 11, 2021

(54) TILTING DEVICE AND METHOD FOR VEHICLE AND VEHICLE

(71) Applicant: Beijing Niu Information Technology Co., Ltd., Beijing (CN)

(72) Inventor: Yilin Hu, Beijing (CN)

(73) Assignee: Beijing Niu Information Technology Co., Ltd., Beijing (CN)

(*) Notice: Subject to any disclaimer, the term of this patent is extended or adjusted under 35 U.S.C. 154(b) by 102 days.

(21) Appl. No.: 16/408,015

(22) Filed: May 9, 2019

(65) Prior Publication Data
    US 2020/0207436 A1    Jul. 2, 2020

(30) Foreign Application Priority Data
    Dec. 29, 2018    (CN) .......................... 201811647719.9

(51) Int. Cl.
    *B62K 5/10*    (2013.01)
    *B62K 5/027*    (2013.01)
    *B62K 5/08*    (2006.01)

(52) U.S. Cl.
    CPC ................ *B62K 5/10* (2013.01); *B62K 5/027* (2013.01); *B62K 5/08* (2013.01); *B60G 2300/122* (2013.01)

(58) Field of Classification Search
    CPC . B62K 5/10; B62K 5/027; B62K 5/08; B60G 2300/122
    See application file for complete search history.

(56) References Cited

U.S. PATENT DOCUMENTS

| 6,817,617 | B2* | 11/2004 | Hayashi | B62K 5/05 280/124.1 |
| 2008/0012262 | A1 | 1/2008 | Carabelli et al. | |
| 2010/0025944 | A1* | 2/2010 | Hara | B62D 9/02 280/5.509 |
| 2014/0346753 | A1* | 11/2014 | Huang | B62D 9/04 280/269 |
| 2016/0107713 | A1* | 4/2016 | Takano | B62K 5/10 180/210 |
| 2017/0106930 | A1* | 4/2017 | Hara | B62K 5/027 |
| 2017/0106935 | A1* | 4/2017 | Hara | B62K 5/027 |

(Continued)

FOREIGN PATENT DOCUMENTS

| CN | 102092435 | 6/2011 |
| CN | 102470909 | 5/2012 |

(Continued)

OTHER PUBLICATIONS

Extended European Search Report for European Patent Application 19170871.8, dated Oct. 22, 2019.

*Primary Examiner* — Drew J Brown
(74) *Attorney, Agent, or Firm* — Andrus Intellectual Property Law, LLP (57) ABSTRACT

Provided is a tilting device and method for a vehicle and the vehicle. The tilting device for the vehicle includes a main frame, a steering mechanism disposed on the main frame, a detent mechanism that is disposed on the main frame and the steering mechanism and that is configured to control a tilt angle of the vehicle where the tilt angle is an angle between the vehicle and a first plane, and a control mechanism that is disposed on the vehicle and electrically connected to the detent mechanism and that is configured to control the tilt angle by controlling the detent mechanism.

19 Claims, 6 Drawing Sheets

(56) References Cited

U.S. PATENT DOCUMENTS

| | | | |
|---|---|---|---|
| 2017/0106936 A1* | 4/2017 | Shibuya | B62K 5/027 |
| 2019/0144035 A1* | 5/2019 | Doerksen | B60G 17/018 |
| | | | 280/124.103 |
| 2019/0232749 A1* | 8/2019 | Di Tanna | B62K 5/05 |
| 2020/0070921 A1* | 3/2020 | Zheng | B62K 5/10 |
| 2020/0262503 A1* | 8/2020 | Garcia-Atance Fatjo | |
| | | | B62K 15/006 |

FOREIGN PATENT DOCUMENTS

| | | |
|---|---|---|
| EP | 2154050 | 6/2011 |
| EP | 2019772 | 8/2013 |
| EP | 3103713 | 12/2016 |
| EP | 3124366 | 2/2017 |
| EP | 3366558 | 8/2018 |

\* cited by examiner

TILTING DEVICE AND METHOD FOR VEHICLE AND VEHICLE

CROSS-REFERENCES TO RELATED APPLICATIONS

This application claims the priority of a Chinese Patent Application No. 201811647719.9, filed Dec. 29, 2018, disclosure of which is incorporated herein by reference in its entirety.

TECHNICAL FIELD

The present disclosure relates to the technical field of vehicles, and more particularly relates to a tilting device and method for a vehicle as well as the vehicle.

BACKGROUND

To improve the stability of an existing motorcycle, there has been a hybrid vehicle that combines stability of an automobile with manipulability of a motorcycle, such as an inverted tricycle (including two front wheels and one rear wheel). Furthermore, to effectively improve the rollover resistance of such a vehicle during turning, the vehicle is generally provided with a tiltable mechanism facilitating the inner wheels of the vehicle to produce sufficient positive pressure against the ground to balance a centrifugal force the vehicle is subjected to.

However, when the vehicle is traveling at a low speed or stops, the tiltable mechanism may sway such that the main frame (frame) of the vehicle would also sway side to side, causing the vehicle to roll over. For example, when the vehicle is traveling at a low speed along a straight line on a road having poor road surface conditions, the main frame would be in a constant swayable state. Therefore, the main frame of the vehicle will be difficult to maintain balance and easily sway in the case of frequent jolting such that the driver may fall off the vehicle due to unstable center of gravity, endangering the driver's personal safety.

SUMMARY

In view of the above, an object of the present disclosure is to provide a tilting device and method for a vehicle and the vehicle to alleviate the problem that a vehicle is easy to sway and improve driving safety.

To achieve this object, the present disclosure provides the following technical solutions:

In a first aspect, an embodiment of the present disclosure provides a tilting device for the vehicle, including:

a main frame;

a steering mechanism, disposed on the main frame;

a detent mechanism, disposed on the main frame and the steering mechanism and configured to control a tilt angle of the vehicle, where the tilt angle is an angle between the vehicle and a first plane; and a control mechanism, disposed on the vehicle, electrically connected to the detent mechanism and configured to control the tilt angle by controlling the detent mechanism.

In a second aspect, an embodiment of the present disclosure provides a vehicle including the tilting device for a vehicle in the first aspect.

In a third aspect, an embodiment of the present disclosure provides a tilting method for the vehicle in the second aspect. The method includes the steps described below.

A control mechanism receives a trigger signal.

Then the control mechanism controls a tilt angle of the vehicle by controlling a detent mechanism, where the tilt angle is an angle between the vehicle and a first plane.

The technical solutions in the present disclosure have the following beneficial effects: in the embodiments of the present disclosure, the vehicle is provided with the control mechanism and the electrically controllable detent mechanism. The control mechanism may automatically control the detent mechanism to control the tilt angle of the vehicle, thereby automatically controlling the tilt angle. Meanwhile, the tilt angle of the vehicle may be controlled over a range of angles capable of maintaining the main frame in a balanced state, thereby preventing the vehicle from swaying left and right. Therefore, when a driver drives the vehicle and the vehicle tends to roll over, the driver does not need to control the vehicle with his/her own sense of balance to prevent the vehicle from rolling over, and the driver also does not need to manually trigger a locking action of a tiltable mechanism. Merely the tilting device for the vehicle may automatically control the tilt angle of the vehicle in time, prevent the main frame of the vehicle from swaying left and right greatly, and maintain the main frame of the vehicle in the balanced state, thereby effectively preventing the vehicle from swaying left and right and improving the driver's safety. On the other hand, the driver may manually trigger the control mechanism to control the detent mechanism to control the tilt angle of the vehicle and thus the driver may directly control the detent mechanism as needed to maintain the main frame of the vehicle in the balanced state (including a tilt state) so that the vehicle does not sway left and right.

BRIEF DESCRIPTION OF DRAWINGS

Exemplary embodiments of the present disclosure will be described in detail with reference to the accompanying drawings to enable those having ordinary skill in the art to better understand the foregoing and other features and advantages of the present disclosure. In the accompanying drawings.

DETAILED DISCLOSURE

Technical solutions of the present disclosure will be described in greater detail below by way of specific embodiments in conjunction with the accompanying drawings. It should be understood that the specific embodiments set forth below are merely intended to illustrate rather than limit the present disclosure. Additionally, it should be noted that only part, rather than all, of the structures related to the present disclosure are illustrated in the accompanying drawings, for ease of description.

Figure 1:
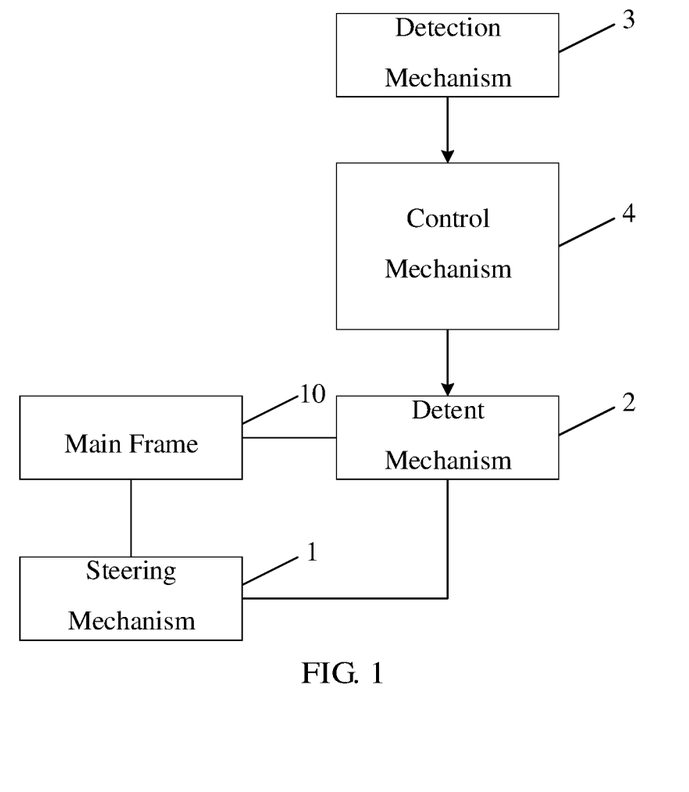
FIG. 1 is a block diagram illustrating a tilting device for a vehicle according to an embodiment of the present disclosure.

Based on the technical problem in the background, an embodiment of the present disclosure provides a tilting device for a vehicle, and the tilting device for the vehicle is applicable to vehicles with three, four or more wheels which may be configured with one front wheel and two rear wheels, two front wheels and one rear wheel, two wheels and two rear wheels, or the like. FIG. 1 is a block diagram illustrating a tilting device for a vehicle according to an embodiment of the present disclosure. As illustrated shown in FIG. 1, the tilting device for the vehicle in the embodiment includes a main frame 10, a steering mechanism 1, a detent mechanism 2, and a control mechanism 4.

The steering mechanism 1 is disposed on the main frame 10 and may be configured to steer the vehicle.

The detent mechanism 2 is disposed on the main frame 10 and the steering mechanism 1 and configured to control a tilt angle of the vehicle. The tilt angle is an angle between the vehicle and a first plane.

The control mechanism 4 is disposed on the vehicle, electrically connected to the detent mechanism 2 and configured to control the tilt angle by controlling the detent mechanism.

In the embodiment, the first plane extends in a longitudinal direction of the vehicle and is perpendicular to the ground. A detection mechanism 3 may include at least a gyroscope to detect the tilt angle when the vehicle tilts. The control mechanism 4 may be a microcontroller such as a single chip microcomputer.

The tilting device for the vehicle provided by the present disclosure provides the control mechanism and the electrically controllable detent mechanism on the vehicle. The control mechanism may automatically control the detent mechanism to control the tilt angle of the vehicle, thereby automatically controlling the tilt angle. Meanwhile, the tilt angle of the vehicle may be controlled over a range of angles capable of maintaining the main frame in a balanced state, thereby preventing the vehicle from swaying left and right. Therefore, when a driver drives the vehicle and the vehicle tends to roll over, the driver does not need to control the vehicle with his/her own sense of balance to prevent the vehicle from rolling over, and the driver also does not need to manually trigger a locking action of the tiltable mechanism. Merely the tilting device for the vehicle may automatically control the tilt angle of the vehicle in time, prevent the main frame of the vehicle from swaying left and right greatly, and maintain the main frame of the vehicle in the balanced state, thereby effectively preventing the vehicle from swaying left and right and improving driving safety of the driver. On the other hand, the driver may manually trigger the control mechanism to control the detent mechanism to control the tilt angle of the vehicle and thus the driver may directly control the detent mechanism as needed to maintain the main frame of the vehicle in the balanced state (including a tilt state) so that the vehicle does not sway left and right.

Optionally, to automatically control the tilt angle of the vehicle, referring still to FIG. 1, the tilting device for the vehicle may further include the detection mechanism 3 disposed on the vehicle and configured to detect a state of the vehicle. The state of the vehicle includes at least the tilt angle.

Exemplarily, after the vehicle is started, the detection mechanism 3 detects the state of the vehicle in real time and sends state of the vehicle information to the control mechanism 4; the control mechanism 4 receives, analyzes and processes the state of the vehicle information, and sends a tilt angle control signal to the detent mechanism 2 according to an analysis and processing result; the detent mechanism 2 controls the tilt angle based on the received tilt angle control signal. For example, when the detection mechanism 3 detects that the vehicle tilts a small angle, it indicates that the main frame of the vehicle is still in the balanced state; to prevent the tilt angle from increasing and the main frame of the vehicle from going imbalanced, the control mechanism 4 controls the detent mechanism 2 to control the tilt angle so that the tilt angle of the vehicle may be controlled to be in the range of angles capable of maintaining the main frame in the balanced state, thereby maintaining the main frame of the vehicle in the balanced state and preventing the vehicle from swaying left and right.

Optionally, the detent mechanism includes a locking portion and a tiltable portion. The locking portion is configured to control the tilt angle by controlling the tiltable portion. The tiltable portion is configured to enable the main frame to tilt freely during high-speed turnings so that inner wheels of the vehicle can produce sufficient positive pressure against the ground to balance a centrifugal force applied to the vehicle and prevent the vehicle from rolling over.

The tiltable portion may be any form of structure which may be locked and unlocked, such as an existing four-bar linkage or a balance plate. When the tiltable portion is locked, the tiltable portion does not undergo elastic deformation such as extension and retraction, and the main frame of the vehicle is fixed and does not sway left and right so that the vehicle travels steadily. When the tiltable portion is unlocked, the tiltable portion is subjected to a force and undergoes the elastic deformation such as extension and retraction, and the main frame of the vehicle also sways left and right with the tiltable portion. The locking portion may be any form of structure which may be electrically controlled, and may lock and unlock the tiltable portion, such as an assembly including a drive portion and a lock pin.

In one embodiment, the control mechanism is specifically configured to determine, according to the state of the vehicle detected by the detection mechanism, whether the tilt angle is less than a preset angle. If the tilt angle is determined to be less than the preset angle, the locking portion is controlled to lock the tiltable portion so that the tilt angle may be fixed at an angle to further improve the steadiness of the vehicle. Optionally, the preset angle is 10° to maintain the main frame of the vehicle in the balanced state.

Figure 2:
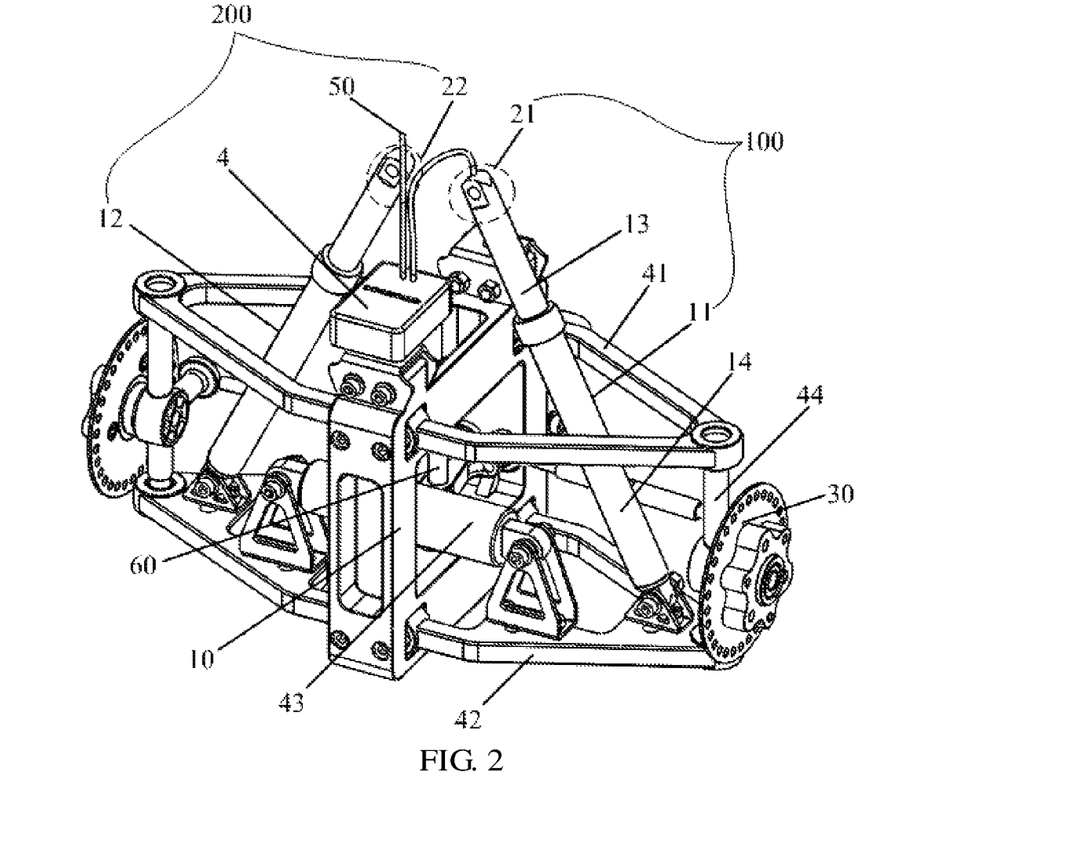
FIG. 2 is a partial schematic diagram illustrating a vehicle including a tilting device for a vehicle according to an embodiment of the present disclosure.
Figure 3:
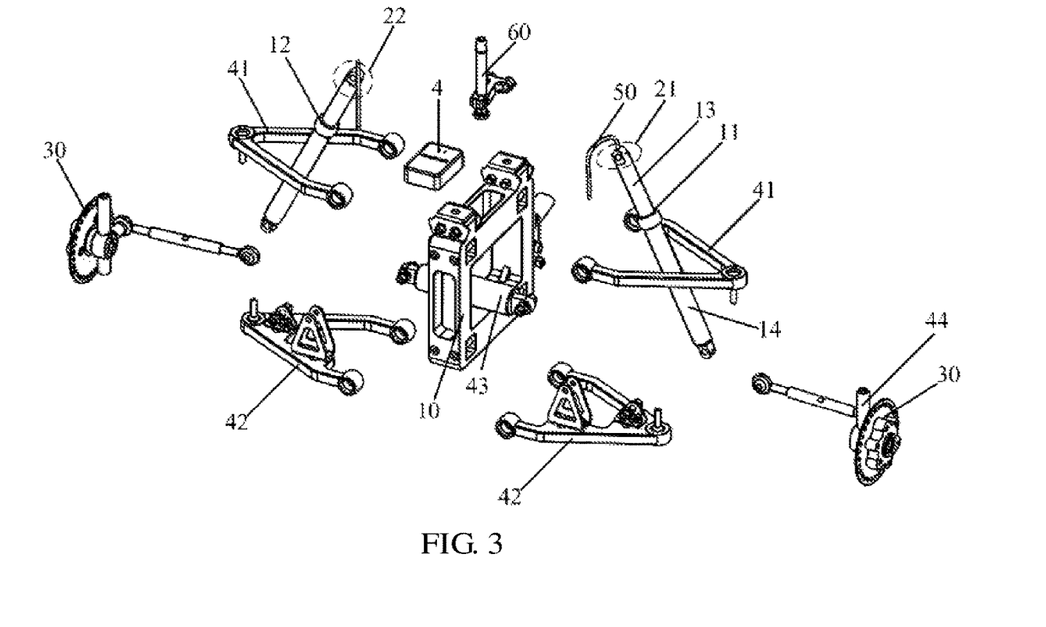
FIG. 3 is an exploded diagram illustrating various components in the structure illustrated in FIG. 2.

Optionally, based on the above technical solution, in a specific embodiment of the present disclosure, as illustrated in FIG. 2 and FIG. 3, the detent mechanism includes an electronically controlled hydraulic rod disposed on each of both sides of the main frame 10. The electronically controlled hydraulic rod includes a hydraulic rod body and a micro motor disposed on the hydraulic rod body (disposed within the hydraulic rod body). The micro motor is configured to control the extension and retraction of the hydraulic rod body. The hydraulic rod body may be used as a tiltable portion and the micro motor may be used as a locking portion to control the tilt angle of the vehicle by controlling the extension and retraction of the hydraulic rod body. In FIG. 2, the electronically controlled hydraulic rod disposed on each of both sides of the main frame 10 includes a first electronically controlled hydraulic rod 100 and a second electronically controlled hydraulic rod 200. The first electronically controlled hydraulic rod 100 includes a first hydraulic rod body 11 and a first micro motor 21. The second electronically controlled hydraulic rod 200 includes a second hydraulic rod body 12 and a second micro motor 22. Each of the first hydraulic rod body 11 and the second hydraulic rod body 12 includes a cylinder body 13 and a piston assembly. The piston assembly includes a piston and a piston rod 14. The piston is disposed in the cylinder body 13 and has a first surface and a second surface opposite to the first surface. The cylinder body 13 is divided by the piston into a first chamber on the side of the first surface of the piston and a second chamber on the side of the second surface of the piston. A first end of the piston rod 14 is fixed to the second surface of the piston and a second end of the piston rod 14 extends outside the cylinder body 13. The cylinder body 13 is hinged to the main frame 10, and the second end of the piston rod 14 is hinged to the steering mechanism. Each electronically controlled hydraulic rod is further provided with a communication passage configured to communicate the first chamber with the second chamber. The micro motor is configured to control the extension and retraction of the piston rod 14 by controlling the communication passage to open or close. The first chamber and the second chamber may be filled with a hydraulic oil, a gas or a mixture of oil and gas.

In the embodiment, the electronically controlled hydraulic rod includes both the tiltable portion and the locking portion, that is, the tiltable portion and the locking portion are integrated, thereby avoiding a complicated design of individual structures of the tiltable portion and the locking portion, and a design of connecting the tiltable portion to the locking portion, greatly simplifying the structure of the tilting device for the vehicle and reducing the occupied space of the tilting device for the vehicle.

Specifically, the micro motor includes a motor push rod which can block the communication passage defined in the piston assembly; or the cylinder body 13 is provided with a first opening in the first chamber and a second opening in the second chamber, the electronically controlled hydraulic rod further includes a passage communicating the first opening and the second opening to form the communication passage, and a hydraulic valve is disposed at the first opening and controlled by the motor push rod to control the communication of the communication passage. In the embodiment, the control mechanism provides the micro motor with a fixed duration of pulses to enable the motor push rod to rotate to a fixed length to close the communication passage; at this time, the pressures of the first chamber and the second chamber remain unchanged so that the piston cannot move and the piston rod cannot expand or contract, that is, the hydraulic rod body is locked. When the communication passage enables the first chamber to communicate with the second chamber, the piston is pushed and pulled by the piston rod when the vehicle sways left and right so that the piston presses the hydraulic oil, the gas or the mixture of oil and gas in the first chamber and/or the second chamber; at this time, the hydraulic oil, the gas or the mixture of oil and gas in the first chamber and the second chamber will circulate to enable the piston to move freely with the left and right sway of the vehicle.

Optionally, the tilting device for the vehicle may further include a locked state detection mechanism electrically connected to the control mechanism and configured to detect a communication state of the communication passage. The locked state detection mechanism includes a pressure sensitive sensor or a touch switch, which is disposed at the communication passage. Therefore, the control mechanism may determine whether to lock the hydraulic rod body according to the communication state of the communication passage fed back by the locked state detection mechanism.

In addition, based on the above technical solution, referring still to FIG. 2 and FIG. 3, the steering mechanism includes an upper suspension frame 41, a lower suspension frame 42, a damper 43, and a steering seat 44. The upper suspension frame 41 and the lower suspension frame 42 are oppositely disposed, a middle portion of the upper suspension frame 41 is fixed to an upper portion of the main frame 10 and a middle portion of the lower suspension frame 42 is fixed to a lower portion of the main frame 10. Two ends of the upper suspension frame 41 are inserted in an upper end of the steering seat 44 and two ends of the lower suspension frame 42 are inserted into a lower end of the steering seat 44. The cylinder body 13 is hinged to the upper portion of the main frame 10 and the second end of the piston rod 14 is hinged to the lower suspension frame 42. Optionally, the damper 43 is horizontally disposed on the main frame 10 and two ends of the damper 43 are hinged to the lower suspension frame 42.

Referring to FIG. 2, the micro motor (including the first micro motor 21 and the second micro motor 22) is electrically connected to the control mechanism 4 through an electric wire 50 and the micro motor may be disposed at one end of the cylinder body of the electronically controlled hydraulic rod facing away from the piston rod. The electric wire 50 may include a grounding wire, a control wire for controlling an operation of the micro motor and a detection wire for receiving a feedback signal of the locked state detection mechanism. In addition, the piston rod may be a hollow structure, the micro motor may be disposed in the piston rod, and the electric wire 50 is disposed in the piston rod and electrically connected to the micro motor.

Figure 4:
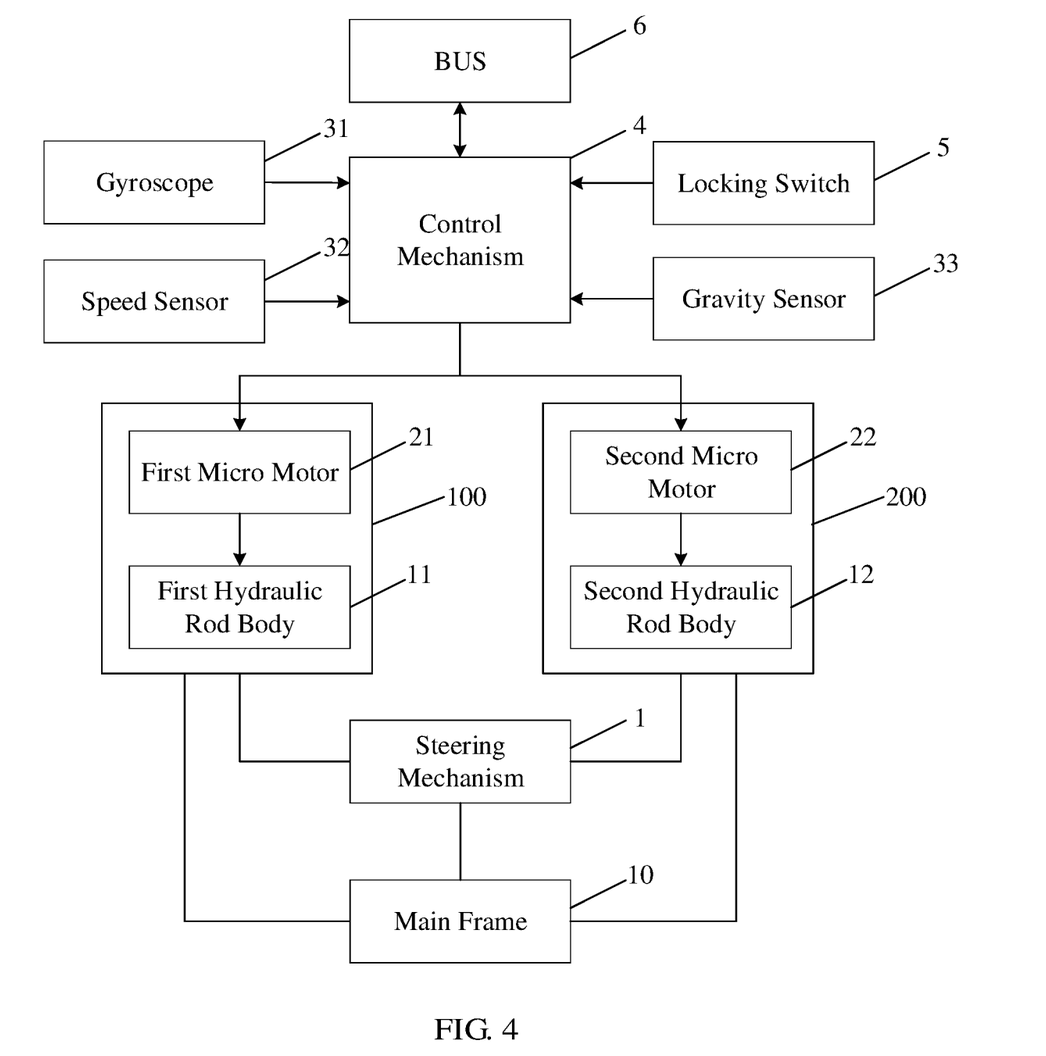
FIG. 4 is a block diagram illustrating another tilting device for a vehicle according to an embodiment of the present disclosure.

Optionally, based on the above technical solution, considering that the tiltable portion must be unlocked to prevent the vehicle from rolling over during the high-speed turnings, to prevent the control mechanism from locking the tiltable portion only by determining the tilting angle, in one embodiment, as illustrated in FIG. 4, the detection mechanism includes a gyroscope 31 for detecting the tilt angle and a speed sensor 32 for detecting a traveling speed of the vehicle.

Accordingly, the control mechanism 1 is further configured to determine, according to the traveling speed of the vehicle detected by the speed sensor 32, whether the traveling speed of the vehicle is less than a preset speed, if the traveling speed of the vehicle is determined to be less than the preset speed, determine whether the tilt angle is less than the preset angle; and if the traveling speed of the vehicle is determined to be greater than or equal to the preset speed, control the locking portion to unlock the tiltable portion. Optionally, the preset speed is 2 km/h and may not only ensure safety during straight line driving at the low speed or low-speed turnings but also prevent the vehicle from rolling over during high-speed turnings.

Optionally, referring to FIG. 4, the detection mechanism may further include a gravity sensor 33. The control mechanism 4 is further configured to determine, according to a detection result of the gravity sensor 33 and/or the speed sensor 32, whether the vehicle is in a traveling state; if the vehicle is determined to be in the traveling state, determine whether the traveling speed of the vehicle is less than the preset speed; and if the vehicle is determined as not in the traveling state, control the locking portion to lock the tiltable portion. Therefore, when the vehicle is determined as not in the traveling state, the control mechanism may directly control the locking portion to lock the tiltable portion to avoid determining the traveling speed and the tilt angle of the vehicle. That is, when the vehicle stops, the tiltable portion is locked to prevent the halted vehicle from rolling over.

Optionally, the tilting device for the vehicle in the embodiment may further include the locked state detection mechanism electrically connected to the control mechanism and configured to detect whether the tiltable portion is locked; accordingly, the control mechanism 4 is further configured to determine whether to unlock or lock the tiltable portion according to a detection result of the locked state detection mechanism. For example, in the case where the locked state detection mechanism detects that the tiltable portion has been locked, if the control mechanism 4 determines to send a lock control signal to the locking portion according to the state of the vehicle, the control mechanism 4 does not need to send the lock control signal, but if the control mechanism 4 determines to send an unlock control signal to the locking portion according to the state of the vehicle, the control mechanism 4 would send the unlock control signal.

It should be noted that the locked state detection mechanism may not be provided in the embodiment. In this case, the control mechanism 4 directly sends the lock control signal or the unlock control signal to the locking portion according to the state of the vehicle. In the case where the control mechanism 4 directly sends the lock control signal to the locking portion according to the state of the vehicle, if the locking portion has performed a locking operation, the locking portion does need to operate; if the locking portion has not performed the locking operation, the locking portion would lock the tiltable portion.

Optionally, referring still to FIG. 4, the control mechanism 4 may be a central control system of the vehicle. In this case, the control mechanism 4 communicates with the whole vehicle through a bus 6 and the control mechanism 4 is further configured to detect whether each module of the vehicle fails when the vehicle is started to ensure a normal operation of each module of the vehicle and the driving safety of the vehicle. In the embodiment, the various modules of the vehicle may include a power supply module, an engine control module, an automatic transmission control module, a dashboard control module and the like. When the control mechanism 4 detects whether each module of the vehicle fails, the control mechanism 4 may send a fault detection request to each module. If a module responds to the request, it indicates that the module is normal; otherwise, the module fails and a fault warning may be issued at this time to prompt a driver for maintenance.

Optionally, referring still to FIG. 4, the tilting device for the vehicle in the embodiment may further include a locking switch 5 electrically connected to the control mechanism 4 and configured to send a lock signal or an unblock signal to the control mechanism 4 according to a state of the locking switch 5. Exemplarily, when the driver switches on the locking switch 5, the lock signal is triggered to the control mechanism 4, and at this time, the control mechanism 4 is forced to send the lock control signal to the locking portion; when the driver switches off the locking switch 5, the unlock signal is triggered to the control mechanism 4 and at this time, the control mechanism 4 is forced to send the unlock control signal to the locking portion. Therefore, by combining a manual mode and an automatic mode to lock or unlock the tiltable portion, when one mode fails, the other mode may be employed to lock or unlock the tiltable portion, thereby further improving the driving safety.

Based on the embodiments described above, referring to FIG. 4, a specific working principle of the tilting device for the vehicle provided by the present disclosure is described below. When the vehicle is started, the control mechanism 4 detects whether each module of the vehicle fails. If one module fails, the fault warning is issued. If there is no fault, the control mechanism 4 determines whether the vehicle is in the traveling state according to the detection result of the gravity sensor 33 and/or the speed sensor 32. If the vehicle is determined to be in the traveling state, the control mechanism 4 determines whether the traveling speed of the vehicle is less than the preset speed according to the traveling speed of the vehicle detected by the speed sensor 32. If the vehicle is determined to be not in the traveling state, the control mechanism 4 sends the lock control signal to the first micro motor 21 and the second micro motor 22. At this time, the first micro motor 21 locks the first hydraulic rod body 11 and the second micro motor 22 locks the second hydraulic rod body 12 so that the piston rod of the first hydraulic rod body 11 and the piston rod of the second hydraulic rod body 12 cannot expand and contract, thereby fixing the main frame 10 of the vehicle. If the mechanism 4 determines that the traveling speed of the vehicle is less than the preset speed, the control mechanism 4 determines whether the tilt angle is less than the preset angle according to the tilt angle detected by the gyroscope 31. If the control mechanism 4 determines that the traveling speed of the vehicle is greater than or equal to the preset speed, the control mechanism 4 sends the unlock control signal to the first micro motor 21 and the second micro motor 22. At this time, the first micro motor 21 unlocks the first hydraulic rod body 11 and the second micro motor 22 unlocks the second hydraulic rod body 12 so that the piston rod of the first hydraulic rod body 11 and the piston rod of the second hydraulic rod body 12 may expand and contract freely, and the main frame 10 of the vehicle would be able to tilt freely, thereby preventing the vehicle from rolling over during high-speed turnings. If the control mechanism 4 determines that the tilt angle is less than the preset angle, the control mechanism 4 sends the lock control signal to the first micro motor 21 and the second micro motor 22. At this time, the first micro motor 21 locks the first hydraulic rod body 11 and the second micro motor 22 locks the second hydraulic rod body 12. If the control mechanism 4 determines that the tilt angle is greater than or equal to the preset angle, the control mechanism 4 issues an imbalance warning to remind the driver that the main frame 10 of the vehicle cannot be maintained in the balanced state and enable the driver to manually balance the main frame 10.

In addition, an embodiment of the present disclosure further provides a vehicle, including the tilting device for the vehicle according to any embodiment of the present disclosure.

Figure 5:
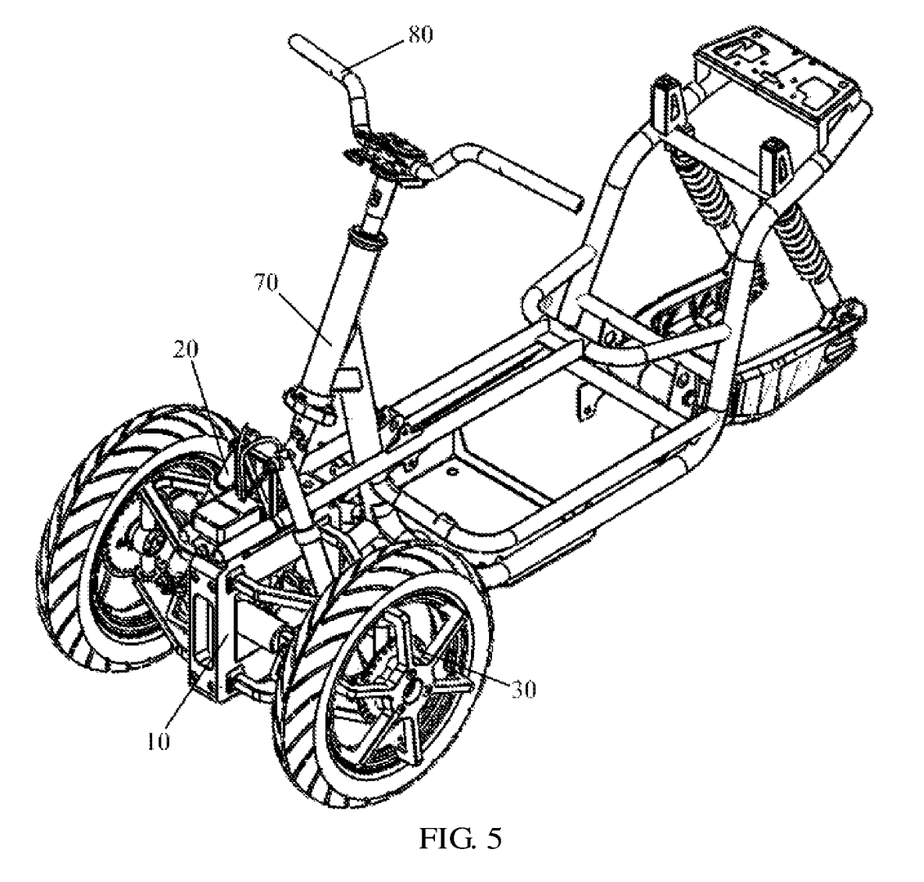
FIG. 5 is a schematic diagram illustrating an overall structure of an inverted tricycle according to an embodiment of the present disclosure.

Exemplarily, referring to FIG. 2, FIG. 3 and FIG. 5, the vehicle may further include two front wheels 30, a rear wheel (not shown), a steering arm 60, a front bogie 70 and a handlebar 80. The steering mechanism includes the upper suspension frame 41, the lower suspension frame 42, the damper 43 and the steering seat 44. The upper suspension frame 41 and the lower suspension frame 42 are oppositely disposed, the middle portion of the upper suspension frame 41 is fixed to the upper portion of the main frame 10 and the middle portion of the lower suspension frame 42 is fixed to the lower portion of the main frame 10. The two ends of the upper suspension frame 41 and the two ends of the lower suspension 42 are connected to the two front wheels through the upper end and the lower end of the steering seat 44 respectively. The damper 43 is horizontally disposed on the main frame 10 and the two ends of the damper 43 are hinged to the lower suspension frame 42. A lower end of the steering arm 60 is fixed to the main frame 10. An upper end of the steering arm 60 is fixed to a lower end of the front bogie 70. An upper end of the front bogie 70 is fixed to a middle portion of the handlebar 80.

In the embodiment, when the tilting device for the vehicle includes the electronically controlled hydraulic rod disposed on each of both sides of the main frame 10 (including the first electronically controlled hydraulic rod and the second electronically controlled hydraulic rod, the first electronically controlled hydraulic rod includes the first hydraulic rod body 11 and the first micro motor 21, and the second electronically controlled hydraulic rod includes the second hydraulic rod body 12 and the second micro motor 22), the cylinder body 13 in the electronically controlled hydraulic rod is hinged to the upper portion of the main frame 10, and the piston rod 14 is hinged to the lower suspension frame 42.

In the above embodiment, both the upper suspension frame 41 and the lower suspension frame 42 may be independent suspension frames, or may be non-independent suspension frames. The vehicle may be tiltable vehicles such as a tricycle, an inverted tricycle and a four-wheeler.

The vehicle provided in the embodiment includes the tilting device for the vehicle provided in the embodiments of the present disclosure, and has the dame functions and beneficial effects.

Figure 6:
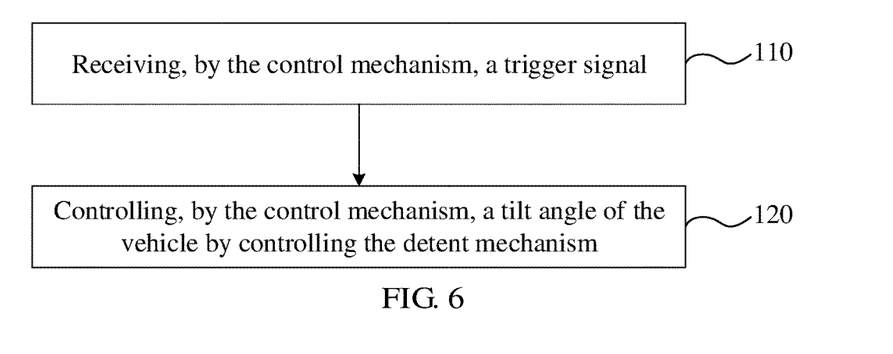
FIG. 6 is a flowchart illustrating a tilting method for a vehicle according to an embodiment of the present disclosure.

An embodiment of the present disclosure further provides a tilting method for a vehicle, which may be executed by the tilting device for the vehicle provided in the embodiments of the present disclosure. Specifically, as illustrated in FIG. 6, the tilting method for the vehicle in the embodiment includes the steps described below.

In step 110, the control mechanism receives a trigger signal.

Exemplarily, when the tilt angle of the vehicle is manually controlled, the trigger signal is the lock signal or the unlock signal triggered by a user through the locking switch. When the tilt angle of the vehicle is automatically controlled, the trigger signal is the state information of the vehicle.

In step 120, the control mechanism controls the tilt angle of the vehicle by controlling the detent mechanism.

The tilt angle is the angle between the vehicle and the first plane. The first plane extends in the longitudinal direction of the vehicle and is perpendicular to the ground. After receiving the trigger signal, the control mechanism controls the locking portion to lock or unlock the tiltable portion to control the tilt angle of the vehicle.

Optionally, the tilting method for the vehicle further includes the following step: the control mechanism detects the state of the vehicle through the detection mechanism. The state of the vehicle includes at least the tilt angle of the vehicle. At this time, the control mechanism controls the tilt angle of the vehicle by controlling the detent mechanism according to the state of the vehicle.

In this step, the tilt angle may be detected by the gyroscope. When the tilt angle is determined to be less than the preset angle (for example, 10°), the locking portion is controlled to lock the tiltable portion to fix the main frame of the vehicle. The tiltable portion is disposed on the main frame of the vehicle to enable the main frame to tilt left and right. The locking portion is disposed on the tiltable portion and configured to lock or unlock the tiltable portion. The locking portion and the tiltable portion may be the electronically controlled hydraulic rod in the embodiments described above.

The tilting method for the vehicle in the embodiment and the tilting device for the vehicle provided in the embodiments of the present disclosure belong to a general inventive concept. The tilting method for the vehicle may be executed by the tilting device for the vehicle and has the same functions and beneficial effects. Details of the embodiment may refer to the embodiments described above of the tilting device for the vehicle.

Optionally, detecting the state of the vehicle includes detecting the tilt angle and the traveling speed of the vehicle.

The tilting method for the vehicle further includes determining, according to the traveling speed of the vehicle, whether the traveling speed of the vehicle is less than the preset speed. The preset speed may be 2 km/h.

If the traveling speed of the vehicle is determined to be less than the preset speed, whether the tilt angle is less than the preset angle is determined according to the state of the vehicle. If the traveling speed of the vehicle is determined to be greater than or equal to the preset speed, the locking portion is controlled to unlock the tiltable portion.

Optionally, detecting the state of the vehicle further includes detecting whether the vehicle is in the traveling state before detecting the tilt angle and the traveling speed of the vehicle.

If the vehicle is determined to in the traveling state, whether the traveling speed of the vehicle is less than the preset speed is determined. If the vehicle is determined to be not in the traveling state, the locking portion is controlled to lock the tiltable portion.

Optionally, before the locking portion is controlled to unlock the tiltable portion, and before the locking portion is controlled to lock the tiltable portion, the method further includes the step described below.

Whether the tiltable portion is locked is detected.

Figure 7:
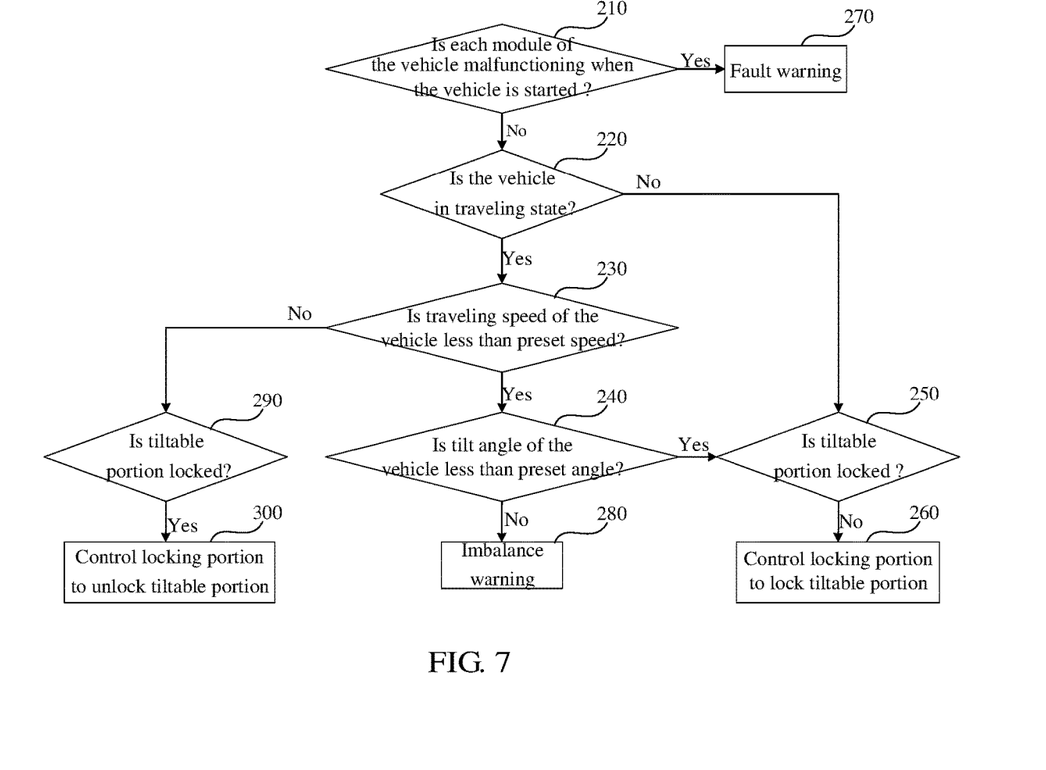
FIG. 7 is a flowchart illustrating another tilting method for a vehicle according to an embodiment of the present disclosure.

Based on the above technical solution, in another specific embodiment of the present disclosure, as illustrated in FIG. 7, the tilting method for the vehicle may specifically include the steps described below.

In step 210, when the vehicle is started, whether each module of the vehicle fails is detected.

If it is detected that any module of the vehicle fails, step 270 is performed; if it is detected that each module of the vehicle is normal, step 220 is performed.

In step 220, whether the vehicle is in the traveling state is detected.

If it is detected that the vehicle is traveling, step 230 is performed; if it is detected that the vehicle stops, step 250 is performed.

In step 230, whether the traveling speed of the vehicle is less than the preset speed is determined.

If the traveling speed of the vehicle is determined to be less than the preset speed, step 240 is performed; if the traveling speed of the vehicle is determined to be greater than or equal to the preset speed, step 290 is performed.

In step 240, whether the tilt angle is less than the preset angle is determined.

If the tilt angle is determined to be less than the preset angle, step 250 is performed; if the tilt angle is determined to be greater than or equal to the preset angle, step 280 is performed.

In step 250, whether the tiltable portion is locked is detected.

In step 260, the locking portion is controlled to lock the tiltable portion.

In step 270, the fault warning is issued.

In step 280, the imbalance warning is issued.

In step 290, whether the tiltable portion is locked is detected.

In step 300, the locking portion is controlled to unlock the tiltable portion.

It should be noted that the above are only preferred embodiments of the present disclosure and the technical principles used therein. It will be understood by those skilled in the art that the present disclosure is not limited to the embodiments described herein. Those skilled in the art can make various apparent modifications, adaptations, combinations and substitutions without departing from the scope of the present disclosure. Therefore, while the present disclosure has been described in detail via the above-mentioned embodiments, the present disclosure is not limited to the above-mentioned embodiments and may include more other equivalent embodiments without departing from the concept of the present disclosure. The scope of the present disclosure is determined by the scope of the appended claims.

The invention claimed is:

1. A tilting device for a vehicle, comprising:
a main frame;
a steering mechanism, disposed on the main frame;
a detent mechanism, disposed on the main frame and the steering mechanism and configured to control a tilt angle of the vehicle, wherein the tilt angle is an angle between the vehicle and a first plane; and
a control mechanism, disposed on the vehicle and electrically connected to the detent mechanism, the control mechanism being configured to control the tilt angle by controlling the detent mechanism;
wherein the detent mechanism comprises an electronically controlled hydraulic rod disposed on each of both sides of the main frame, wherein the electronically controlled hydraulic rod comprises a hydraulic rod body and a micro motor disposed on the hydraulic rod body, wherein the micro motor is configured to control extension and retraction of the hydraulic rod body, wherein the hydraulic rod body comprises a cylinder body and a piston assembly, wherein the piston assembly comprises a piston and a piston rod, the piston is disposed in the cylinder body and comprises a first surface and a second surface opposite to the first surface, the piston divides the cylinder body into a first chamber located on a side of the first surface of the piston and a second chamber located on a side of the second surface of the piston, the piston rod comprises a first end that is fixed to the second surface of the piston and a second end that extends outside the cylinder body, the cylinder body is hinged to the main frame, and the second end of the piston rod is hinged to the steering mechanism; and
wherein the electronically controlled hydraulic rod is further provided with a communication passage configured to communicate the first chamber with the second chamber, and the micro motor is configured to control extension and retraction of the piston rod by controlling the communication passage to open or close.

2. The tilting device of claim 1, further comprising: a detection mechanism disposed on the vehicle and electrically connected to the control mechanism, the detection mechanism being configured to detect a state of the vehicle, wherein the state of the vehicle comprises at least the tilt angle; and wherein the control mechanism is configured to control the tilt angle by controlling the detent mechanism, based on the state of the vehicle detected by the detection mechanism.

3. The tilting device of claim 1, wherein the detent mechanism comprises a locking portion and a tiltable portion, wherein the locking portion is configured to control the tilt angle by controlling the tiltable portion, wherein the control mechanism is configured to determine whether the tilt angle is less than a preset angle based on the state of the vehicle detected by the detection mechanism, and control the locking portion to lock up the tiltable portion in response to determining that the tilt angle is less than the preset angle.

4. The tilting device of claim 3, wherein the detection mechanism comprises a gyroscope configured for detecting the tilt angle and a speed sensor configured for detecting a traveling speed of the vehicle.

5. The tilting device of claim 4, wherein the control mechanism is further configured to: determine whether the traveling speed of the vehicle is less than a preset speed based on the traveling speed of the vehicle detected by the speed sensor, and further determine whether the tilt angle is less than the preset angle in response to determining that the traveling speed of the vehicle is less than the preset speed; and in response to determining that the traveling speed of the vehicle is greater than or equal to the preset speed, control the locking portion to unlock the tiltable portion.

6. The tilting device of claim 5, wherein the detection mechanism further comprises a gravity sensor; and
the control mechanism is further configured to determine whether the vehicle is in a traveling state based on a detection result of the gravity sensor and/or the speed sensor, and determine whether the traveling speed of the vehicle is less than the preset speed in response to determining that the vehicle is in the traveling state; and control the locking portion to lock the tiltable portion in response to determining that the vehicle is not in the traveling state.

7. The tilting device of claim 3, further comprising: a locked state detection mechanism electrically connected to the control mechanism, the locked state detection mechanism being configured to detect whether the tiltable portion is locked;
wherein the control mechanism is further configured to determine whether to unlock or lock the tiltable portion according to a detection result of the locked state detection mechanism.

8. The tilting device of claim 1, further comprising: a locking switch electrically connected to the control mechanism and, the locking switch being configured to send a lock signal or unblock signal to the control mechanism according to a switch state of the locking switch.

9. The tilting device of claim 1, further comprising: a locked state detection mechanism electrically connected to the control mechanism, the locked state detection mechanism being configured to detect a communication state of the communication passage;
wherein the locked state detection mechanism comprises a pressure sensitive sensor or a touch switch and is disposed at the communication passage.

10. The tilting device of claim 1, wherein the micro motor comprises a motor push rod; and
the communication passage is opened in the piston assembly and the motor push rod is operative to block the communication passage; or the cylinder body is provided with a first opening in the first chamber and a second opening in the second chamber, the electronically controlled hydraulic rod further comprises a passage communicating the first opening and the second opening that forms the communication passage, wherein a hydraulic valve is disposed at the first opening, and the motor push rod is configured to control the communication of the communication passage by controlling the hydraulic valve.

11. The tilting device of claim 1, wherein the steering mechanism comprises an upper suspension frame, a lower suspension frame, a damper, and a steering seat;
wherein the upper suspension frame and the lower suspension frame are oppositely disposed, a middle portion of the upper suspension frame is fixed to an upper portion of the main frame, and a middle portion of the lower suspension frame is fixed to a lower portion of the main frame; and two ends of the upper suspension frame are hinged to an upper end of the steering seat, and two ends of the lower suspension frame are hinged to a lower end of the steering seat; and
wherein the cylinder body is hinged to the upper portion of the main frame, and the second end of the piston rod is hinged to the lower suspension frame, wherein the damper is horizontally disposed through the main frame, wherein both ends of the damper are hinged to the lower suspension frame.

12. A vehicle, comprising the tilting device for a vehicle according to claim 1.

13. The vehicle of claim 12, further comprising: two front wheels, a rear wheel, a steering arm, a front bogie, and a handlebar; wherein the steering mechanism comprises an upper suspension frame, a lower suspension frame, a damper, and a steering seat; the upper suspension frame and the lower suspension frame are oppositely disposed, a middle portion of the upper suspension frame is fixed to an upper portion of a main frame, and a middle portion of the lower suspension frame is fixed to a lower portion of the main frame; two ends of the upper suspension frame and two ends of the lower suspension are connected to the two front wheels through an upper end and a lower end of the steering seat respectively; the damper is horizontally disposed through the main frame, wherein two ends of the damper are hinged to the lower suspension frame; a lower end of the steering arm is fixed to the main frame; an upper end of the steering arm is fixed to a lower end of the front bogie; and an upper end of the front bogie is fixed to a middle portion of the handlebar.

14. A tilting method for the vehicle of claim 12, the tilting method comprising:
receiving, by the control mechanism, a trigger signal; and
controlling, by the control mechanism, a tilt angle of the vehicle by controlling the detent mechanism, wherein the tilt angle is an angle between the vehicle and a first plane.

15. The tilting method of claim 14, wherein the controlling by the control mechanism a tilt angle of the vehicle by controlling the detent mechanism comprises:
controlling, by the control mechanism, the locking portion to lock or unlock the tiltable portion.

16. The tilting method of claim 15, further comprising:
detecting, by the control mechanism, a state of the vehicle through the detection mechanism, wherein the state of the vehicle comprises at least the tilt angle of the vehicle;
wherein the controlling, by the control mechanism, a tilt angle of the vehicle by controlling the detent mechanism comprises:
controlling, by the control mechanism, the tilt angle of the vehicle by controlling the detent mechanism based on the state of the vehicle.

17. The tilting method of claim 16, wherein detecting the state of the vehicle comprises: detecting the tilt angle and a traveling speed of the vehicle; and
wherein the tilting method further comprises: determining whether the traveling speed of the vehicle is less than a preset speed based on the traveling speed of the vehicle; and
in response to determining that the traveling speed of the vehicle is less than the preset speed, determining whether the tilt angle is less than a preset angle based on the state of the vehicle; and in response to determining that the traveling speed of the vehicle greater than or equal to the preset speed, controlling the locking portion to unlock the tiltable portion.

18. The tilting method of claim 17, wherein detecting the state of the vehicle further comprises: detecting whether the vehicle is in a traveling state before detecting the tilt angle and the traveling speed of the vehicle.

19. The tilting method of claim 18, wherein before controlling the locking portion to unlock the tiltable portion, and before controlling the locking portion to lock the tiltable portion, the method further comprises:
detecting whether the tiltable portion is locked.

* * * * *